April 9, 1935.  N. B. GREEN  1,997,332
ROLL FILM CAMERA AND SPOOLING SYSTEM
Filed March 1, 1934  3 Sheets-Sheet 1
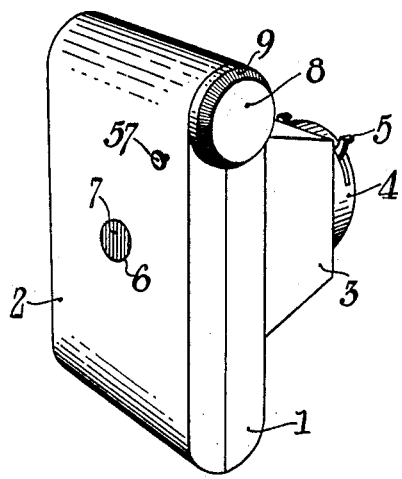
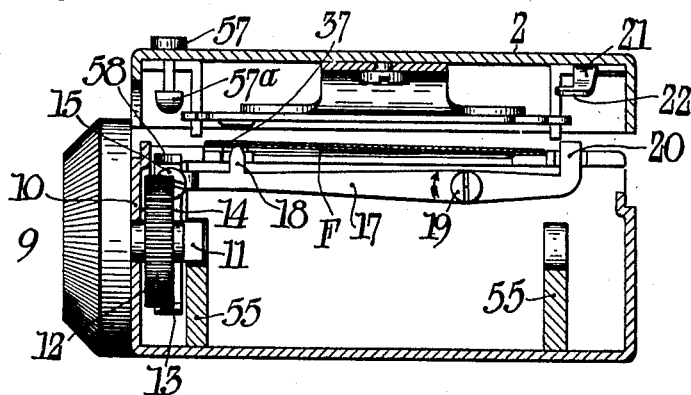
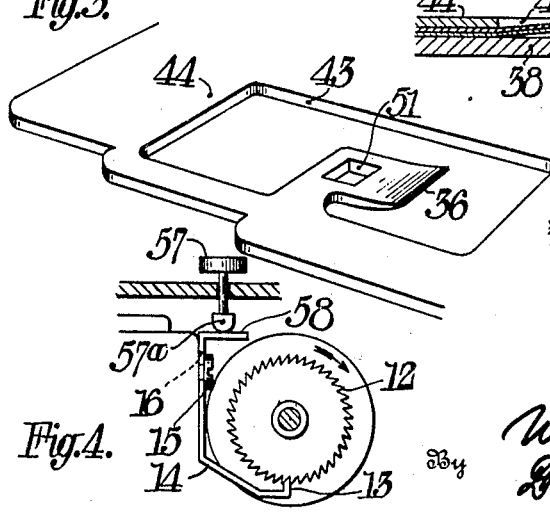
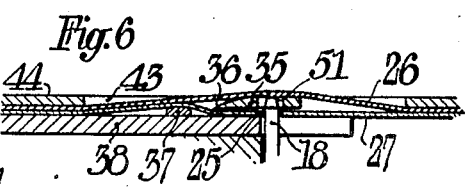
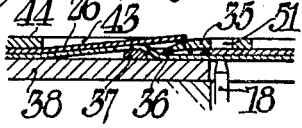
Inventor:
Newton B. Green,
By Newton M. Perrins,
Donald H. Stewart.
Attorneys April 9, 1935.  N. B. GREEN  1,997,332
ROLL FILM CAMERA AND SPOOLING SYSTEM
Filed March 1, 1934    3 Sheets-Sheet 2
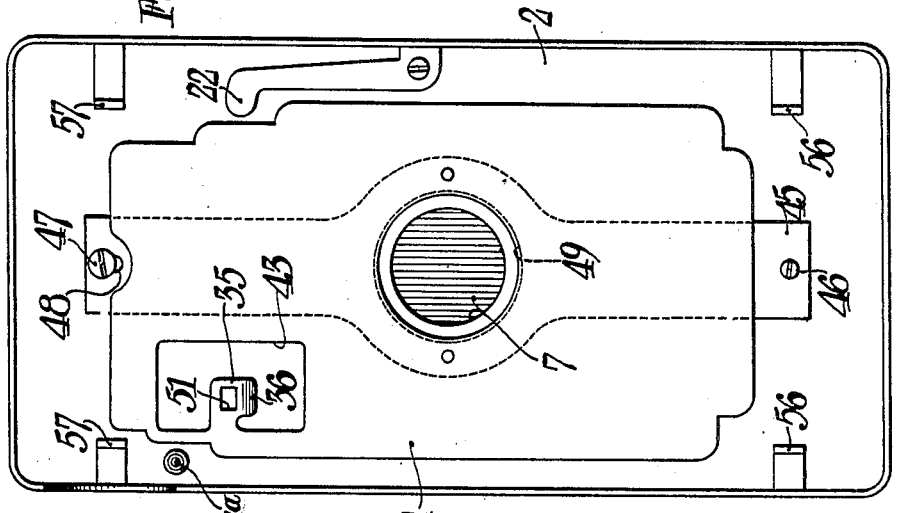
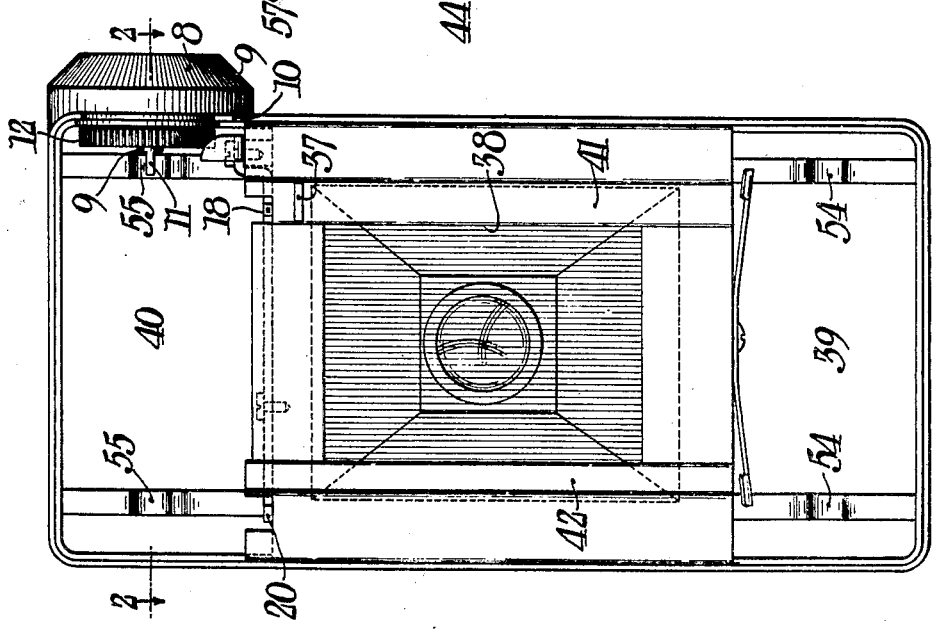
Inventor:
Newton B. Green,
By
Attorneys April 9, 1935.  N. B. GREEN  1,997,332
ROLL FILM CAMERA AND SPOOLING SYSTEM
Filed March 1, 1934  3 Sheets-Sheet 3
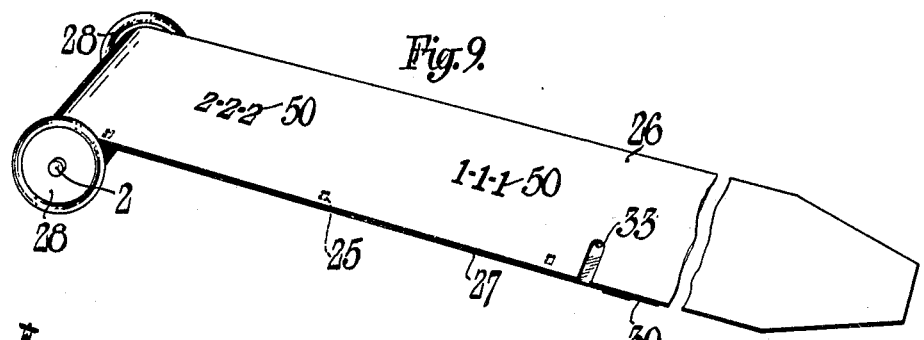
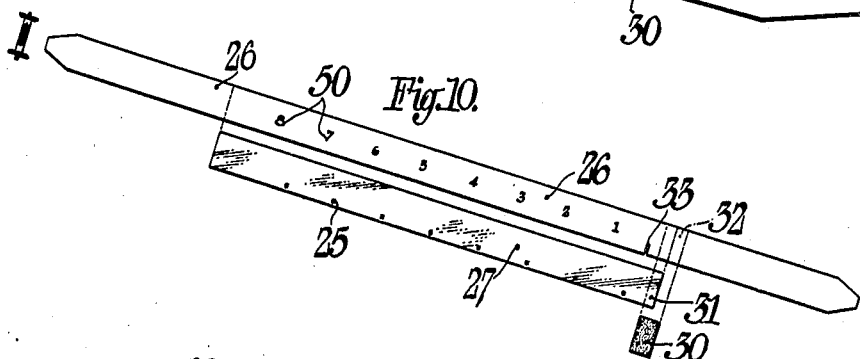
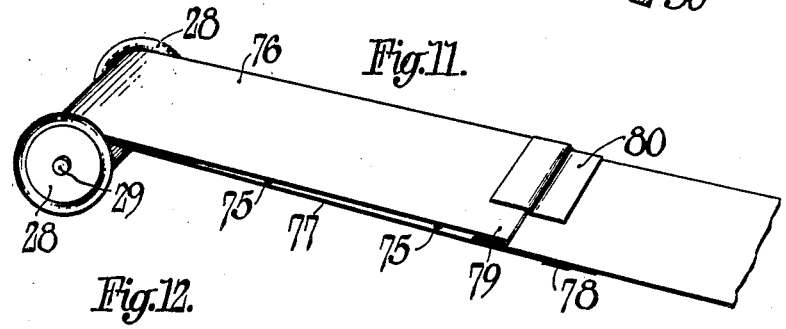
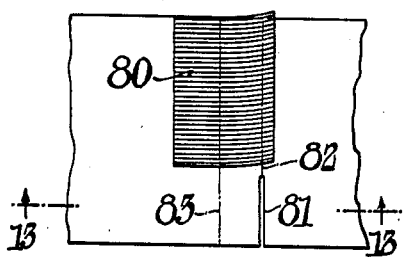
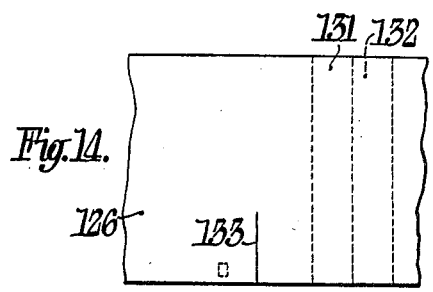
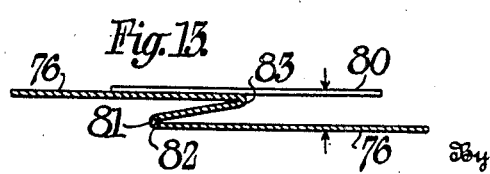
Inventor:
Newton B. Green,
By
Attorneys.

Patented Apr. 9, 1935

1,997,332

UNITED STATES PATENT OFFICE 1,997,332

ROLL FILM CAMERA AND SPOOLING SYSTEM

Newton B. Green, Rochester, N. Y., assignor to Eastman Kodak Company, Rochester, N. Y., a corporation of New York Application March 1, 1934, Serial No. 713,554

11 Claims. (Cl. 95—31)

This invention relates to photography and more particularly to photographic cameras in which a special type of film is used and wound through a camera by a special type of mechanism. One object of my invention is to provide a camera with a winding system which is automatically locked after an area of film is wound into an exposure position. Another object of my invention is to provide such a camera in which the locking means is actuated by a lug entering a film aperture and to provide a mechanism for separating the film backing paper and film to permit the free movement of the lug in the film aperture. Another object of my invention is to provide a film camera in which a knife-like member enters an opening between the backing paper and film to separate the film and backing paper as it is wound through the camera. Another object of my invention is to provide a device which will insure the proper separation of the film backing paper and film over a small area thereof during the winding operation. Another object of my invention is to provide a film winding mechanism for cameras in which the locking lug is resiliently pressed against the film when the camera back is in place and in which the locking lug may lie in an inoperative position when the camera back is removed so that film may be freely threaded into the camera in initially loading the camera and other objects will appear from the following specification the novel features being particularly pointed out in the claims at the end thereof.

This invention, which includes the camera and the film cartridge, is for an improvement over the film and camera shown in the copending applications of B. A. Hultquist, E. R. Bradford Serial Nos. 713,548 and 713,549, filed March 1, 1934 wherein the broad idea of a camera which will separate the film and backing paper to permit an automatic film winding stop to function and a film for such a camera are shown broadly.

Coming now to the drawings wherein like characters denote like parts throughout:

Fig. 1 is a perspective view of a typical camera constructed in accordance and embodying a preferred form of my invention;

Fig. 2 is a sectional view through the camera shown in Fig. 1, being taken on the line 2—2 of Fig. 8 with the addition of the camera back in place on the camera body;

Fig. 3 is a fragmentary detail perspective view of the separator which is here shown as being integral with the film presser plate;

Fig. 4 is a fragmentary detail partially in section of the film spool winding locking device;

Figs. 5 and 6 are fragmentary detail views showing the film and backing paper coming into contact with the separator and being separated by the separator;

Fig. 7 is a top plan view of the camera back removed from the camera shown on an enlarged scale;

Fig. 8 is a top plan view of the camera with the back removed also shown on a large scale;

Fig. 9 is a fragmentary perspective view of a preferred form of film band adapted to be used with the camera;

Fig. 10 is an exploded plan view showing the elements which go into the film cartridge shown in Fig. 9 in separated positions;

Fig. 11 is a perspective view of a section embodiment of a film band which may be used with the camera shown in the first 8 figures;

Fig. 12 is a fragmentary detail view of a portion of the film backing paper before being folded and assembled;

Fig. 13 is a section on line 13—13 of Fig. 12 but with the backing paper partially folded before assembling; and Fig. 14 is a fragmentary detail view of still another type of backing paper which can be used with a film band constructed in accordance with my invention.

In the small or miniature sized cameras it is particularly difficult to view small numbers on a backing paper through a small red window in the camera back because the film band must be wound only a short distance to present a fresh area of film in front of the exposure frame. Some means is necessary or desirable to prevent unwinding and consequent loss of a film exposure.

According to a preferred embodiment of my invention, which may be incorporated in a camera of any size but which is particularly adapted for use on a miniature sized camera, the camera may consist of the more or less standard type in which there is a body portion 1 having a removable back 2 and a front extension 3 which carries a shutter 4. This shutter normally supports an objective and may be actuated in the usual manner by a trigger 5. As thus far described any standard camera construction can be used.

The camera back 2 is provided with an opening 6 covered by a red window 7. The winding key may comprise an annular member 8 serrated at 9 so that it may be readily grasped and turned by an operator.

Referring particularly to Figs. 2 and 8 the winding device 8 may be permanently attached to a shaft 9 passing through a wall 10 of the camera and may have a film spool engaging web 11 of the usual type on the inner end of the shaft.

There is also permanently carried on this shaft 9 a ratchet wheel 12 which may be engaged as best shown in Fig. 3 by a pawl 13, this pawl being carried by an arm 14 mounted to slide on a stud 15, this stud passing through a slot 16 in the arm. The arm 14 is one arm of a lever 17 carrying a film engaging lug 18, this arm being pivoted upon a stud 19.

Also integral with the arm 17 is a second upstanding lug 20, this lug normally lying in the back of a spring arm 21 carrying an operating head 22. Thus when the camera back is removed the lug 20 is not under spring tension and the film band F (Fig. 2) may be wound freely through the camera onto a take-up spool in the usual manner.

After the film has been properly threaded and started through the camera the camera back 2 may be placed on the camera and this bring the spring 22 into contact without lug 20 and tends to turn the arm 17 in the direction shown by the arrow about the stud 19 thrusting the film engaging lug 18 into contact with the film.

However, the lug 18 will only press against the film during the winding operation until it can pass through an aperture 25 in the film.

In order to have sufficient room to pass through a film aperture 25 it is necessary to space the film backing paper 26 from the film 27 at least over that portion or area of the film which lies close to the locking lug 18.

In order to accomplish this automatically and without attention from an operator the film shown in Figs. 9 and 10 may be used. This film is shown in my copending application, Serial No. 713,553, filed March 1, 1934. From these figures it will appear that a film spool which may consist of a pair of spaced flanges 28 supported on a hub 29 may carry a film band which consists of the parts best shown in Fig. 10, that is, backing paper 26, a film strip 27 and a paster 30. The paster 30 is used to attach one end 31 of the film to the backing paper when it is passed down upon the area 32 of the film backing paper on the underside thereof.

Spaced from this lead end of the film 31 there is a notch 33 cut in the backing paper. This notch must be spaced from the end of the film a distance less than the distance of the first aperture 25 from the end 31 of the film. A notch 33 as shown in Fig. 9 may be used in the film backing paper or as indicated in Fig. 14 the backing paper 126 may be furnished with a slit 133 in the backing paper. In this view the area 132 indicated the area contacted by a paster such as 30 in Fig. 10 and the area 131 indicates the end of the film as held by a paster similar to the paster 30.

In both of these embodiments of my invention there is opening in the plane surface of the backing paper through which a knife-like separator may pass and for convenience in the claims the word "slot" will be used to cover, the notch 33, the slit 133 or any other desirable form of opening through which the separator may pass.

Referring to Figs. 5 and 6, when the film band is being wound through the camera, the backing paper 26 and the film 27 at first pass through the camera together. However, if the film band is wound onto the take-up spool the knife-like separator 35 will come into contact with a slot such as notch 33 or the slit 133 and enter between the two edges of this opening. Fig. 5 illustrates the edge 36 of the knife-like separator entering between the backing paper 26 and the film 27 as these parts forming the film band are moved in the direction shown by the arrow.

In order to insure the entrance of the separator between the edges of the slot I preferably provide a protuberance 37 on the bellows frame 38.

As best shown in Fig. 8 this protuberance may consist merely of a rounded protuberance 37 projecting above the bellows frame 38 only a comparatively few thousandths of an inch. As shown in this figure the film is normally wound across the exposure area 38 from the supply spool chamber 39 to the take-up spool chamber with the edges of the film in contact with the rails 41 and 42. It will be noted that the projection 37 is provided only on one rail 41 and that this projection lies close to the film engaging lug 18. It is, of course, only necessary to separate the film from the backing paper over a small area adjacent the film engaging lug 18 in order to leave room for this lug to move through the film a sufficient distance to permit the pawl 13 to move upwardly into engagement with the ratchet teeth 12 and thus automatically stop positively the winding operation.

Referring to Fig. 7 it will be seen that the knife-like film separator consists of a small arm or projection 35 extending into a cut-out portion 43 of the film presser plate 44. This film presser plate is entirely carried by a spring 45 permanently attached at 46 to the camera back 2 and having a sliding engagement through the pin 47 and slot 48 at the other end with the camera back 2. The spring 45 is provided with a circular opening 49 in the center to expose the usual type of red window 7. Thus while the film is automatically stopped in the winding operation by the structure which as above described the exposure number 50 (Figs. 9 and 10) may be viewed through the red window so that the operator will know the number of exposures which have been completed.

Since the presser plate 44 is carried by the spring 5 which thrusts this plate towards the bellows frame the knife-like separator 35 with its downwardly turned sharp edge 36 is thrust into engagement with the film band on the backing paper side. Thus both the backing paper 26 and the film 27 will be pressed against the exposure frame 38 and will pass over the lug 37 and thus the knife-like separator 36 up to the time that the slot approaches the knife.

When the point 36 of the separator enters the slot, 33 or 133, it immediately passes between the backing paper 26 and the film 27 as best shown in Fig. 6 and separates these two parts of the film band by a distance equal to the thickness of the metal of which the separator is made. I find in practice that metal of 15 or 20 thousandths of an inch in thickness is admirably suitable to the purpose although obviously any thickness of metal desired may be employed.

If desired the knife-like separator 35 may itself be provided with an aperture 51 of such a size that the film engaging lug 18 may pass upwardly into this aperture. This forms a convenient structure and makes certain that there will be a sufficient space for the lug 18 to enter between the backing paper 26 and the film 27.

While it is obvious that the particular type of film spool and film spool supports are not material by way of convenience, I have illustrated the film spools as consisting of a pair of flanges 28 from which the usual type of trunnions 29 project outwardly. These trunnions may be supported in the recesses 54 in the spool chamber 39 and they may be supported in the recesses 55 in the take-up chamber 40. The winding key 11 is adapted to engage the usual type of film spool slot cut in one of the trunnions 29.

The trunnions 29 are held in the recesses above described by means of downwardly projection arms 56 and 57 carried by the camera back. This method of supporting a film support is known and forms no part of my invention.

After an area of film has been wound from the supply chamber 39 to the take-up chamber by means of the winding key 9 when the film engaging lug 18 enters an aperture 25 of the film, the pawl 13 will engage the ratchet 12 and automatically prevent further movement. In order to release the pawl from the ratchet so that a fresh area of film may be wound into place the button 57 best shown in Figs. 1 and 4 may be depressed. This button presses on an outwardly extending flange 58 which may conveniently be formed integrally with the arm 17 by pressing downwardly on flange 58. The arm 17 is depressed so that the lug 18 is withdrawn from the film aperture while the lug 20 comprises the spring 22. A fresh area of film may be then wound into place.

It should be especially noted that since the camera back 2 is locked from the camera body the film winding mechanism locking device is inoperative because it merely idles upon the stud 19 since the spring 21 does not tend to move the arm 17 until the camera back is placed on the camera. This is a useful feature because in loading the camera it is not desirable to have the film locking lug 18 press against the film until it is almost time to stop the film for a first exposure. Thus in threading the film the arm 17 is inoperative but as soon as the camera back is in place the film engaging lug resiliently presses upwardly against the film band.

It is obvious that the camera structure above described is also useful with film constructed in accordance with the showing of the copending application Serial No. 713,553, filed March 1, 1934, such a film being shown in Figs. 11 to 13, inclusive. As is shown here the film spool may be identical with the film spool described in Fig. 9. The film band consists of a backing paper 76 and a film 77, this film being connected to the backing paper 76 by means of a paster 78. The film is perforated at 75 in the same manner as the film shown in Fig. 9 but the backing paper is quite different.

The backing paper is provided with a fold designated broadly as 79 and a portion of this fold is held in position by means of an upper paster 80. The reason for this is as follows: Referring to Fig. 12 the backing paper is provided with a slot 81, is folded twice upon the line shown at 82 and 83, so that the fold 82 is underneath the fold 83 as best shown in Fig. 13. Thus the slot 81 lies at the apex of the fold 82. By pressing the paster 80 and the backing paper 76 together from the position shown in Fig. 13 the fold is correctly positioned for the camera.

When such a film is passed through the camera the knife-like separator 35 will press against that part of the backing paper which is not covered by the paster 80 and consequently the seperator will pass freely through the slot 81 and will lie between the backing paper 76 and the film 77 as above described.

It will be noted that in both of the films adapted to be used in my present camera that there is a slot through which the separator may pass. It is also noted that while both types of film cartridges—as shown in Figs. 9 and 11 can pass through my camera it is necessary if the simpler type of film cartridges shown in Figs. 9 and 14 are to be used that there be a projection 37 on the bellows frame 78 to spring the edges of the slot apart as the separator engages the slot. Otherwise it would be possible for the film and backing paper both to pass beneath the separator without being separated.

What I claim as my invention and desire to be secured by Letters Patent of the United States is:

1. In a camera adapted to use film including backing paper with a slit therein, the combination with a body, of a removable back for the body, spool chambers and an exposure frame therebetween, means for winding film through the camera, a film separator carried by the camera adjacent the exposure frame, and means comprising a protuberance on the exposure frame and located near the separator adapted to move strip material being wound through the camera away from the exposure frame.

2. In a camera adapted to use film including backing paper having a slit therein, the combination with a body of a removable back therefore, spool chambers in the camera, an exposure frame therebetween, means for winding film through the camera, a film separator carried by the camera adjacent the exposure frame, means for holding film flat on the exposure frame, a protuberance near the film separator adapted to bend an area of the film backing paper from its normal flat position on the bellows frame and into contact with the film separator whereby said separator may enter said slit as the film is wound through the camera.

3. In a camera adapted to use film including backing paper having a slit therein, the combination with a body of a removable back therefore, spool chambers in the camera, an exposure frame therebetween, means for winding film through the camera, a film aperture engaging lug movably mounted on the camera, means carrying said lug adapted to lock the film winding means in one position, a film separator carried by the camera adjacent the exposure frame, means for holding film flat on the exposure frame, a protuberance near the film separator adapted to bend an area of the film backing paper from its normal flat position on the bellows frame and into contact with the film separator whereby said separator may enter said slit as the film is wound through the camera, whereby a space is provided so that the locking lug may pass freely through a film aperture and stop the film winding operation, and means for releasing the lug from the film aperture to permit further film winding.

4. In combination, a camera including a film winding mechanism, an exposure frame, a presser member adapted to hold film flat on the exposure frame, a protuberance on the exposure frame, and a separator carried by the camera; said camera being adapted to receive a film cartridge including a film backing paper having a slit therein along one edge, a film attached to the backing paper near the slit, and a series of apertures spaced along one edge of the film; said presser being adapted to hold the film flat over the exposure frame of the camera and said protuberance being adapted to raise said backing paper over a limited area to definitely contact it with the separator, whereby said separator may pass through the slit and space the backing paper and film as the film is wound through the camera.

5. In combination, a camera including a film winding mechanism, an exposure frame, a presser member adapted to hold film flat on the exposure frame, a protuberance on the exposure frame, and a separator carried by the camera; said camera being adapted to receive a film cartridge including a film backing paper having a slit therein along one edge, a film attached to the backing paper near the slit, and a series of apertures spaced along one edge of the film; said presser being adapted to hold the film flat over the exposure frame of the camera, and said protuberance being adapted to raise said backing paper over a limited area outside of the exposure frame to definitely contact it with the separator, whereby said separator may pass through the slit and space the backing paper and film as the film is wound through the camera.

6. In combination, a camera including a film winding mechanism, an exposure frame, a presser member adapted to hold film flat on the exposure frame, a protuberance on the exposure frame, a film engaging lug interconnected with the film winding mechanism, and a separator carried by the camera; said camera being adapted to receive a film cartridge including a film backing paper having a slit therein along one edge, a film attached to the backing paper near the slit, and a series of apertures spaced along one edge of the film; said presser being adapted to hold the film flat over the exposure frame of the camera, and said protuberance being adapted to raise said backing paper over a limited area to definitely contact it with the separator, whereby said separator may pass through the slit and space the backing paper and film as the film is wound through the camera so that the film engaging lug may move through an aperture in the film.

7. In combination, a camera including a film winding mechanism, an exposure frame, a presser member adapted to hold film flat on the exposure frame, a protuberance on the exposure frame, a film engaging lug carried by a locking arm, a pawl on said arm, a ratchet on said winding mechanism in the path of said pawl, and a separator carried by the camera; said camera being adapted to receive a film cartridge including a film backing paper having a slit therein along one edge, a film attached to the backing paper near the slit, and a series of apertures spaced along one edge of the film; said presser being adapted to hold the film flat over the exposure frame of the camera, and said protuberance being adapted to raise said backing paper over a limited area to definitely contact it with the separator, whereby said separator may pass through the slit and space the backing paper and film as the film is wound through the camera so that the film engaging lug may pass through an aperture in the film causing the pawl to engage and lock said ratchet against further winding through the winding mechanism, and a release adapted to engage and move the lug from the film aperture.

8. In a camera the combination with a camera body, of a movably mounted camera back adapted to fit on the camera body, an exposure frame, spool chambers at each end thereof, a pair of film guiding rails extending across and forming two sides of the exposure frame, and a film aperture engaging lug adapted to engage a film near the end of one guide rail, and means spaced from said film engaging rail for raising a film band from said rail.

9. In a camera the combination with a camera body, of a movably mounted camera back adapted to fit on the camera body, an exposure frame, spool chambers at each end thereof, a pair of film guiding rails extending across and forming two sides of the exposure frame, a protuberance on the film engaging rail for raising a film band from said rail, and a film and backing paper separator adjacent said protuberance adapted to press the film band down upon the protuberance.

10. In a camera the combination with a camera body, of a movably mounted camera back adapted to fit on the camera body, an exposure frame, spool chambers at each end thereof, a pair of film guiding rails extending across and forming two sides of the exposure frame, a protuberance near the end of one film engaging rail for raising a film band slightly from said rail, a film and backing paper separator carried by said camera back and adapted to press the film band down on one side of the protuberance.

11. In a camera the combination with a camera body, of a movably mounted camera back adapted to fit on the camera body, an exposure frame, spool chambers at each end thereof, a pair of film guiding rails extending across and forming two sides of the exposure frame, a protuberance near the end of one film engaging rail for raising a film band slightly from said rail, a film and backing paper separator carried by said camera back and adapted to press the film band down on one side of the protuberance and means for holding the film flat over all of the exposure frame except at the area adjacent said protuberance.

NEWTON B. GREEN.